(12) United States Patent
Zhu

(10) Patent No.: US 12,281,711 B2
(45) Date of Patent: Apr. 22, 2025

(54) SEALING STRUCTURE OF VALVE BODY, VALVE AND CFLVV VALVE

(71) Applicants: JTR AY AUTOMOTIVE TECHNOLOGIES (JIAXING) CO., LTD., Zhejiang (CN); SHANGHAI JTR AUTOMOTIVE COMPONENT CO., LTD., Shanghai (CN)

(72) Inventor: Xiaotong Zhu, Pinghu (CN)

(73) Assignees: YINGZHI AIYI INTELLIGENT AUTOMOTIVE TECHNOLOGIES (JIAXING) CO., LTD., Zhejiang (CN); SHANGHAI JTR AUTOMOTIVE COMPONENT CO., LTD., Shanghai (CN)

( * ) Notice: Subject to any disclaimer, the term of this patent is extended or adjusted under 35 U.S.C. 154(b) by 35 days.

(21) Appl. No.: 18/038,909

(22) PCT Filed: Jan. 25, 2021

(86) PCT No.: PCT/CN2021/073574
§ 371 (c)(1),
(2) Date: May 25, 2023

(87) PCT Pub. No.: WO2022/110533
PCT Pub. Date: Jun. 2, 2022

(65) Prior Publication Data
US 2024/0019030 A1    Jan. 18, 2024

(30) Foreign Application Priority Data

Nov. 26, 2020   (CN) .......................... 202011346623.6
Nov. 26, 2020   (CN) .......................... 202022784534.1

(51) Int. Cl.
*F16K 1/46*    (2006.01)
*F16K 11/22*   (2006.01)

(52) U.S. Cl.
CPC ................ *F16K 1/46* (2013.01); *F16K 11/22* (2013.01)

(58) Field of Classification Search
CPC ........ F16K 24/042; F16K 24/044; F16K 1/46; F16K 11/22; F16K 21/18; F16K 31/18
(Continued)

(56) References Cited

U.S. PATENT DOCUMENTS 5,439,023 A * 8/1995 Horikawa ............... F16K 17/36
137/202
5,518,018 A * 5/1996 Roetker ........... B60K 15/03519
137/493

(Continued)

FOREIGN PATENT DOCUMENTS

CN        1414273 A     4/2003
CN      102062220 A     5/2011

(Continued)

*Primary Examiner* — Jessica Cahill
(74) *Attorney, Agent, or Firm* — MUNCY, GEISSLER, OLDS & LOWE, P.C.

(57) ABSTRACT

A sealing structure of a valve body, a valve and a CFLVV valve achieves the switching and sealing of an exhaust gas passage in the valve body. A sealing part is provided in an inner cavity of the valve body between a large valve core and a top surface of the inner cavity of the valve body. When it is required to close the large discharge port, the large valve core moves to a closed position, cooperates with the sealing part to close the large discharge port, and forms a first communication passage communicating with the small discharge port. When it is required to further close the small discharge port, the small discharge port can be closed by sealing the first communication passage by lifting the small valve core. Only one sealing part is required to achieve the opening and closing of the two valve cores to the two discharge ports respectively.

15 Claims, 8 Drawing Sheets

(58) Field of Classification Search
USPC .................................................. 137/101.27
See application file for complete search history.

(56) References Cited

U.S. PATENT DOCUMENTS

| | | | | |
|---|---|---|---|---|
| 6,343,590 | B1 * | 2/2002 | Nagai | B60K 15/03504 |
| | | | | 123/518 |
| 6,592,100 | B2 * | 7/2003 | Chou | F16K 24/044 |
| | | | | 251/144 |
| 7,273,042 | B2 * | 9/2007 | Kito | F16K 24/042 |
| | | | | 123/518 |
| 8,844,557 | B2 * | 9/2014 | Matsuo | F16K 24/044 |
| | | | | 137/202 |
| 2002/0157706 | A1 * | 10/2002 | Bergsma | F02M 25/0836 |
| | | | | 137/202 |
| 2004/0187923 | A1 * | 9/2004 | Nishi | F16K 24/042 |
| | | | | 137/202 |
| 2004/0211465 | A1 * | 10/2004 | Miyoshi | F16K 24/044 |
| | | | | 137/202 |
| 2004/0261848 | A1 | 12/2004 | Kayukawa | |

FOREIGN PATENT DOCUMENTS

| | | | |
|---|---|---|---|
| CN | 203309154 U | 11/2013 | |
| CN | 206309954 U | 7/2017 | |
| CN | 209494941 U | 10/2019 | |
| WO | WO0150045 A3 | 12/2001 | |
| WO | WO-2017163661 A1 * | 9/2017 | ........... B60K 15/035 |

* cited by examiner

SEALING STRUCTURE OF VALVE BODY, VALVE AND CFLVV VALVE

TECHNICAL FIELD

The invention belongs to the field of valve technology, and more particularly relates to a sealing structure of a valve body, a valve and a CFLVV valve.

BACKGROUND ART

There are two general requirements for fuel tanks on the market today. 1. Refueling limit (overfilling is prohibited). 2. The fuel tank can be normally vented under certain circumstances. When there is positive pressure in the fuel tank, the pressure can be released in time. Or, when there is negative pressure in the fuel tank, the gas can be replenished into the fuel tank in time. Generally, in order to meet the above requirements of fuel tanks, a fuel tank needs to be equipped with a refueling limit valve and at least one rolling-over valve. There have been new designs on the market that allow a fuel tank valve to meet both of the two functional requirements described above, integrating the functions of the two valves into one product, thus reducing the number of valves that the fuel tank needs to be provided with, and making it easier to lay out on the fuel tank. We generally call it as a combination valve, i.e., combining the refueling limit valve and the rolling-over valve together, so that one product has both functions.

With the promulgation of the National Sixth Stage Pollutant Emission Standards For Motor Vehicles, the requirements for evaporative emissions of the whole fuel system are becoming more and more stringent. The requirements for dynamic leakage of fuel tank (generally including horizontal sloshing test, angular rollover sloshing test and six-axis sloshing test, etc.) are also increasing, so that there is a certain test for the design of valves, whether they are refueling limit valves or rolling-over valves or combination valves, due to that these valves are installed and fixed on the fuel tank, the valve core communicates with the interior of the fuel tank, and the pipe orifices of the valves are generally connected to the carbon tank through pipelines. When the vehicle fluctuates during running, the fuel in the fuel tank will also surge. If the valve core inside the valve cannot seal the exhaust passage in time, the fuel will have a certain probability of surging out of the exhaust passage of the valve, flowing out through the pipe orifices, forming a leakage phenomenon.

Now, according to one of the combination valves existing on the market, the combination valve as a whole is relatively large, one side is a valve core of a refueling limit valve and one side is a valve core of a rolling-over valve, without interfering with each other. However, as the two valve cores are separated, a sealing component cooperating with the valve core needs to be provided respectively. According to another combination valve, the size of the combination valve is similar to that of a common refueling limit valve. The valve core of the refueling limit valve and the valve core of the rolling-over valve are stacked together, with the small float stacked on the large float. The two-stacked form also requires two different sealing components for sealing.

SUMMARY OF THE INVENTION

The technical problem to be solved by the invention is directed to provide a sealing structure of a valve body, a valve and a CFLVV valve, so as to solve the problem that a sealing component of an existing combination valve needs to be separately provided for two valve cores respectively.

In order to solve the technical problems, the technical solution provided by the invention is as follows.

A sealing structure of a valve body of the invention is provided in a valve body; a small discharge port and a large discharge port provided around the small discharge port are provided on a top surface of an inner cavity of the valve body; the small discharge port corresponds to a first exhaust passage, and the large discharge port corresponds to a second exhaust passage; a small valve core corresponds to the small discharge port, and a large valve core corresponds to the large discharge port; the sealing structure comprises:

a sealing part provided in the inner cavity of the valve body and located between the large valve core and the top surface of the inner cavity of the valve body, for cooperating with the large valve core to seal the large exhaust port and close the second exhaust passage, forming a first communication passage communicating the inner cavity of the valve body with the small exhaust port, wherein a bottom end of the first communication passage corresponds to the small valve core;

when it is required to close the large discharge port, the large valve core slides to a closed position and cooperates with the sealing part to seal the large discharge port, and closes the second exhaust passage to form the first communication passage; when it is required to close the small discharge port, the small valve core slides to a closed position and cooperates with the bottom end of the first communication passage to seal the small discharge port and close the first exhaust passage.

According to the sealing structure of the valve body of the invention claim 1, the sealing part includes a bearing member and a sealing assembly;

the bearing member is movably arranged in the inner cavity of the valve body or is fixedly connected to the large valve core; and the bearing member is provided with a through hole matched with the small discharge port;

the sealing assembly is provided on the bearing member and/or on the top surface of the inner cavity of the valve body, and is used for cooperating with the bearing member to seal the large discharge port and cooperating with the small discharge port and the through hole to form the first communication passage.

According to the sealing structure of the valve body of the invention, the sealing assembly comprises a large sealing ring, a medium sealing ring and a small sealing ring;

the large sealing ring and the medium sealing ring are both provided on an upper surface of the bearing member and correspond to the large discharge port; the large sealing ring is sleeved on the large discharge port; the medium sealing ring is located between the large discharge port and the small discharge port; and the small sealing ring is provided at the through hole for cooperating to form the first communication passage.

According to the sealing structure of the valve body of the invention, the sealing assembly comprises a large sealing ring, a medium extension ring, and a small sealing ring;

the large sealing ring is provided on the upper surface of the bearing member, corresponds to the large discharge port, and is sleeved on the large discharge port; the medium extension ring is provided on the top surface of the inner cavity of the valve body, corresponds to the large discharge port and is located between the large discharge port and the small discharge port;

the small sealing ring is provided at the through hole for cooperating to form the first communication passage.

According to the sealing structure of the valve body of the invention, the sealing assembly comprises a large extension ring, a medium sealing ring and a small sealing ring;

the large extension ring is provided on the top surface of the inner cavity of the valve body, corresponds to the large discharge port, and is sleeved on the large discharge port; the medium sealing ring is provided on the upper surface of the bearing member, corresponds to the large discharge port, and is located between the large discharge port and the small discharge port; and the small sealing ring is provided at the through hole for cooperating to form the first communication passage.

According to the sealing structure of the valve body of the invention, the sealing assembly comprises a large extension ring, a medium extension ring and a small sealing ring;

the large extension ring is provided on the top surface of the inner cavity of the valve body, corresponds to the large discharge port, and is sleeved on the large discharge port; the medium extension ring is provided on the top surface of the inner cavity of the valve body, corresponds to the large discharge port, and is located between the large discharge port and the small discharge port; and the small sealing ring is provided at the through hole for cooperating to form the first communication passage.

According to the sealing structure of the valve body of the invention, the sealing assembly comprises a large extension ring and a small extension ring;

the large extension ring is provided on the top surface of the inner cavity of the valve body, corresponds to the large discharge port, and is sleeved on the large discharge port;

the small extension ring is provided on the top surface of the inner cavity of the valve body and corresponds to the large discharge port; an upper end of the small extension ring is located between the large discharge port and the small discharge port, and the diameter of the lower end is smaller than the diameter of the through hole;

the large extension ring, an outer side wall of the small extension ring, and the bearing member cooperate for sealing the large discharge port; and the small extension ring is used to form the first communication passage in cooperation with the small discharge port.

According to the sealing structure of the valve body of the invention, the sealing assembly comprises a sealing assembly including a large extension ring, a medium extension ring and a small extension ring;

the large extension ring is provided on the top surface of the inner cavity of the valve body, corresponds to the large discharge port, and is sleeved on the large discharge port; the medium extension ring is provided on the top surface of the inner cavity of the valve body, corresponds to the large discharge port, and is located between the large discharge port and the small discharge port; and the small extension ring is provided on the top surface of the inner cavity of the valve body for cooperating with the small discharge port to form the first communication passage.

According to the sealing structure of the valve body of the invention, the sealing assembly is integrally formed with the bearing member when the sealing assembly is provided on the bearing member; and the sealing assembly is integrally formed with the valve body when the sealing assembly is provided on the top surface of the inner cavity of the valve body.

According to the sealing structure of the valve body of the invention, the bearing member comprises a bearing unit and a sliding unit; the sliding unit is slidably connected to the inner cavity of the valve body; and the bearing unit is mounted on the sliding unit.

According to the sealing structure of the valve body of the invention, the large discharge port is a plurality of large exhaust holes provided around the small discharge port; the sealing part comprises a sealing assembly including a number of first and second seals; the first seals are respectively provided at the corresponding large exhaust holes for forming a second communication passage communicating the inner cavity of the valve body with the large exhaust holes; and the second seal is provided at the small discharge port for forming the first communication passage.

According to the sealing structure of the valve body of the invention, the sealing part comprises a sealing assembly including a large sealing ring, a medium sealing ring, and a small sealing ring;

the large sealing ring and the medium sealing ring are both provided on the top surface of the inner cavity of the valve body, and correspond to the large discharge port; the large sealing ring is sleeved on the large discharge port; the medium sealing ring is located between the large discharge port and the small discharge port; and the small sealing ring is provided on the top surface of the inner cavity of the valve body for forming the first communication passage.

According to the sealing structure of the valve body of the invention, the sealing part comprises a bearing member and a sealing assembly; the bearing member is provided on the top surface of the large valve core; the bearing member is provided with a through hole matched with the small discharge port;

the sealing assembly comprises a large sealing ring, a medium sealing ring and a small sealing ring; the large sealing ring and the medium sealing ring are both provided on the upper surface of the bearing member and correspond to the large discharge port; the large sealing ring is sleeved on the large discharge port; the medium sealing ring is located between the large discharge port and the small discharge port; and the small sealing ring is provided at the through hole for cooperating to form the first communication passage.

According to the sealing structure of the valve body of the invention, the sealing structure further comprises a pressure maintaining part provided on the valve body; the pressure maintaining part comprises a pressure maintaining shell and a pressure maintaining cap; an accommodating cavity is provided in the pressure maintaining shell, and an inflow passage and an outflow passage in communication with the accommodating cavity are further provided on the pressure maintaining shell; the pressure maintaining shell is provided on the top surface of the valve body, and the inflow passage is in communication with the small discharge port; and the pressure maintaining cap is slidably connected to the accommodating cavity for switching the inflow passage.

According to the sealing structure of the valve body of the invention, the pressure maintaining part further comprises an elevation tube provided between the pressure maintaining shell and the valve body, and both ends are respectively in communication with the small discharge port and the inflow passage of the pressure maintaining shell; and the maintaining shell cooperates with the valve body through the elevation tube to form a large exhaust passage that communicates with the large exhaust port.

According to the sealing structure of the invention, the pressure maintaining part further comprises an elastic member provided in the accommodating cavity, and both ends of the elastic member are respectively connected to an inner wall surface of the accommodating cavity and the pressure maintaining cap for providing a pressing force for the pressure maintaining cap to close the inflow passage.

A valve of the present invention comprises the sealing structure of the valve body as described in any of the above.

A CFLVV valve of the present invention comprises the sealing structure of the valve body as described in any of the above.

Compared with the prior art, the invention has the following advantages and positive effects because it adopts the above technical solutions.

1. According to an embodiment of the invention, a sealing part is provided between the large valve core and the top surface of the valve body cavity in the valve body cavity. A large discharge port and a small discharge port are provided in the valve body. A first exhaust passage corresponding to the small discharge port and a second exhaust passage corresponding to the large discharge port are provided in the valve body. When it is required to close the large discharge port, the large valve core moves to a closed position, cooperates with the sealing part to close the large discharge port, closes the second exhaust passage and forms a first communication passage communicating with the small discharge port. When it is required to further close the small discharge port, the small discharge port can be closed by sealing the first communication passage by lifting the small valve core and closing the first discharge passage. Only one sealing part is required to achieve the opening and closing of the two valve cores to the two discharge ports respectively, which solves the problem that the sealing components of the existing combination valve need to be separately provided for the two valve cores respectively.

2. According to an embodiment of the invention, a pressure maintaining part is further provided at the small discharge port on the basis of the sealing part, so as to seal the inner cavity of the valve body after the large discharge port is closed by the sealing part, and the pressure maintaining part is provided at an outlet of the small discharge port, so as to define a certain pressure at the small discharge port. When the pressure in the inner cavity of the valve body reaches the set pressure, the pressure maintaining cap slides and opens in the pressure maintaining shell, and the fluid in the inner cavity of the valve body can be discharged through the pressure maintaining shell, so as to achieve the function of the rolling-over valve.

Figure 1:
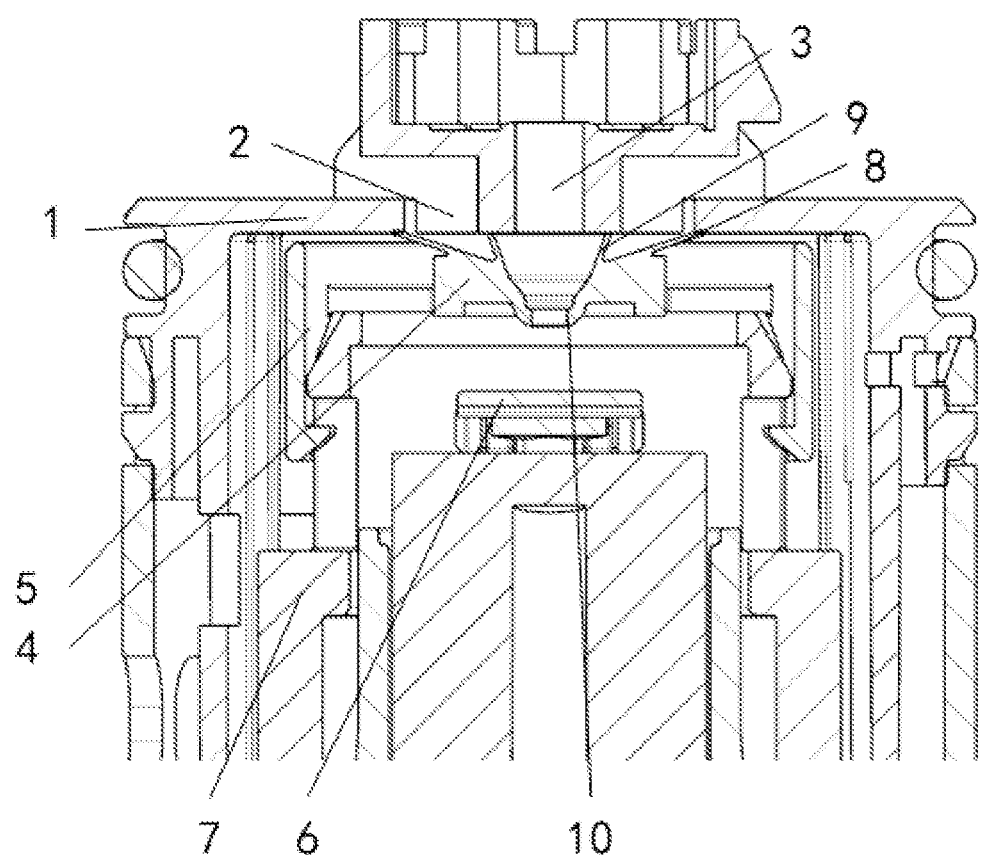
FIG. 1 is a schematic view of an embodiment of a sealing structure of the invention.

Description of Reference Numerals: 1: valve body; 2: large discharge port; 3: small discharge port; 4: bearing member; 401: sealing unit; 402: sliding unit; 5: large valve core; 6: small valve core; 7: large sealing ring; 8: medium sealing ring; 9: small sealing ring; 10: medium extension ring; 11: small extension ring; 12: pressure maintaining shell; 13: pressure maintaining cap; 14: elevation tube; 15: large exhaust passage; 16: elastic member; 17: flow passage.

DETAILED DESCRIPTION OF THE INVENTION

Hereinafter, a valve, a sealing structure and a valve according to the invention will be described in further detail with reference to the accompanying drawings and specific examples. Advantages and features of the invention will become apparent from the following description and claims.

The combination valve referred to in this embodiment is a combination valve capable of achieving both the refueling limit valve function and the rolling-over valve function, and is applied to and installed in a fuel tank.

A sealing structure according to the present embodiment is provided in a valve body 1 of a combination valve having double valve cores for sealing a small discharge port 3 on a top surface of an inner cavity of the valve body 1 and a large discharge port 2 provided around the small discharge port 3. The valve body is provided with a first exhaust passage corresponding to the small discharge port 3 and a second exhaust passage corresponding to the large discharge port 2. The double valve cores are respectively a small valve core 6 corresponding to the small discharge port 3 and a large valve core 5 corresponding to the large discharge port 2.

Referring to FIGS. 1 to 5, the sealing structure specifically includes a sealing part.

The sealing part is provided in the inner cavity of the valve body 1, located between the large valve core 5 and the top surface of the inner cavity of the valve body 1, and used for cooperating with the large valve core 5 to seal the large discharge port 2, and forming a first communication passage for communicating the inner cavity of the valve body 1 with the small discharge port 3. The bottom end of the first communication passage corresponds to the small valve core 6.

In actual operation, the combination valve needs to achieve two situations for different scenarios. The first case is that the large discharge port 2 is closed but the small discharge port 3 is opened, and the second case is that both the large discharge port 2 and the small discharge port 3 are closed.

In the first case, the large valve core 5 moves up to the top end of the inner cavity of the valve body 1 and cooperates with the sealing part to seal the large discharge port 2, close the second discharge passage and form the first communication passage. In the second case, the small valve core 6 moves up to the top end of the inner cavity of the valve body 1, and the top surface of the small valve core 6 cooperates with the bottom end of the first communication passage to seal the opening at the bottom end of the first communication passage, and close the second exhaust passage, thereby closing the small exhaust port 3.

Figure 4:
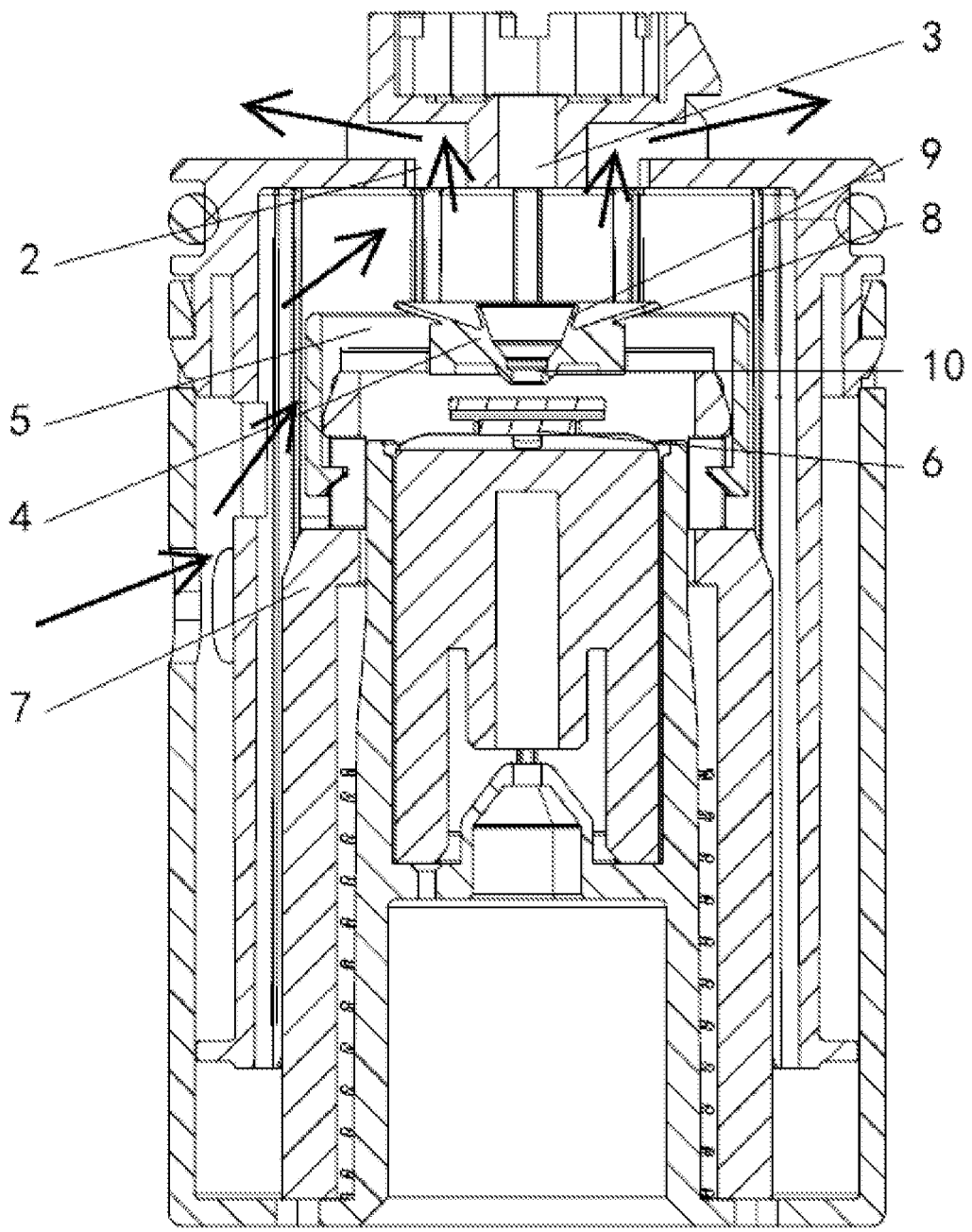
FIG. 4 is a schematic view of a second exhaust passage of the sealing structure of the invention.
Figure 5:
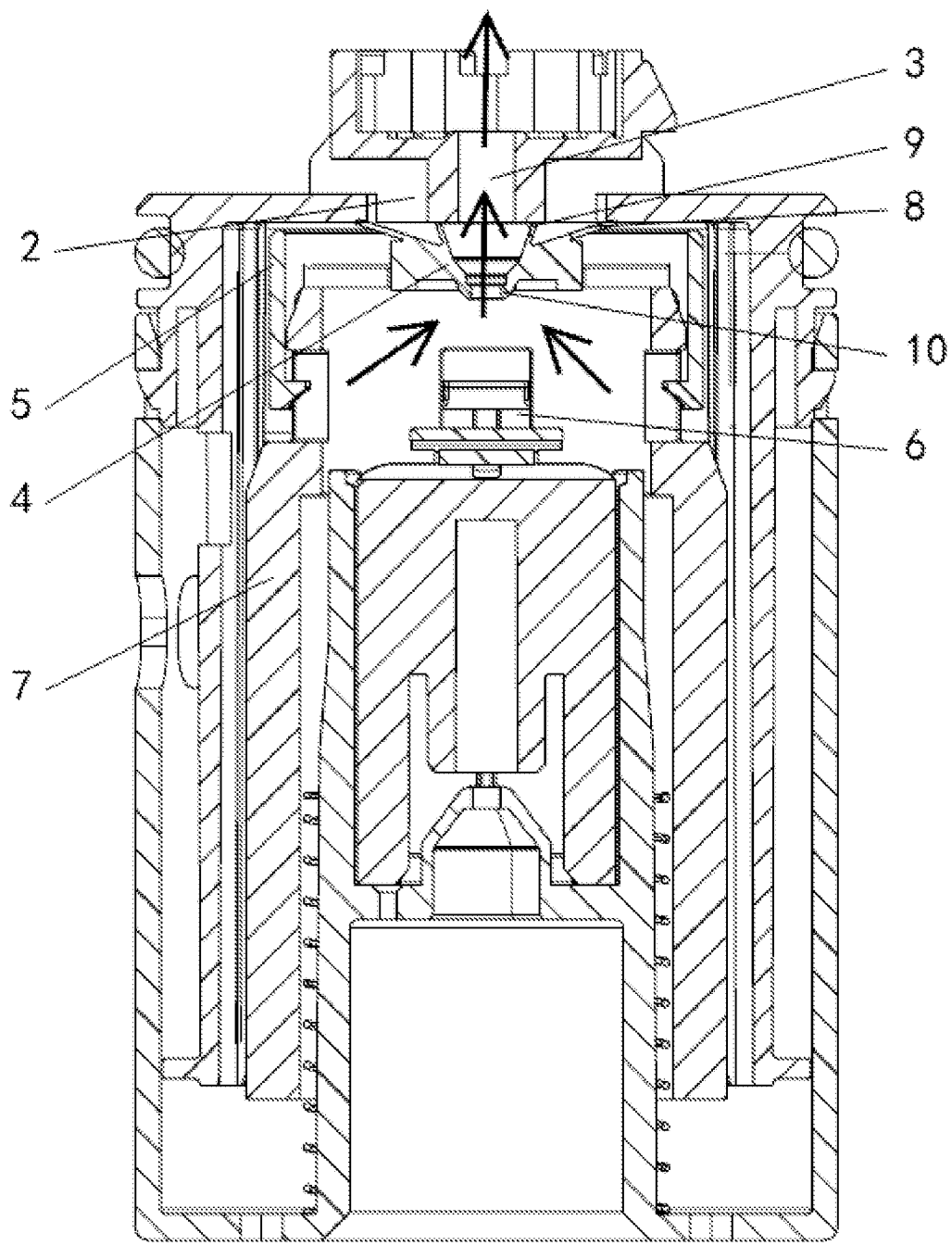
FIG. 5 is a schematic view of a first exhaust passage of the sealing structure of the invention.
Figure 6:
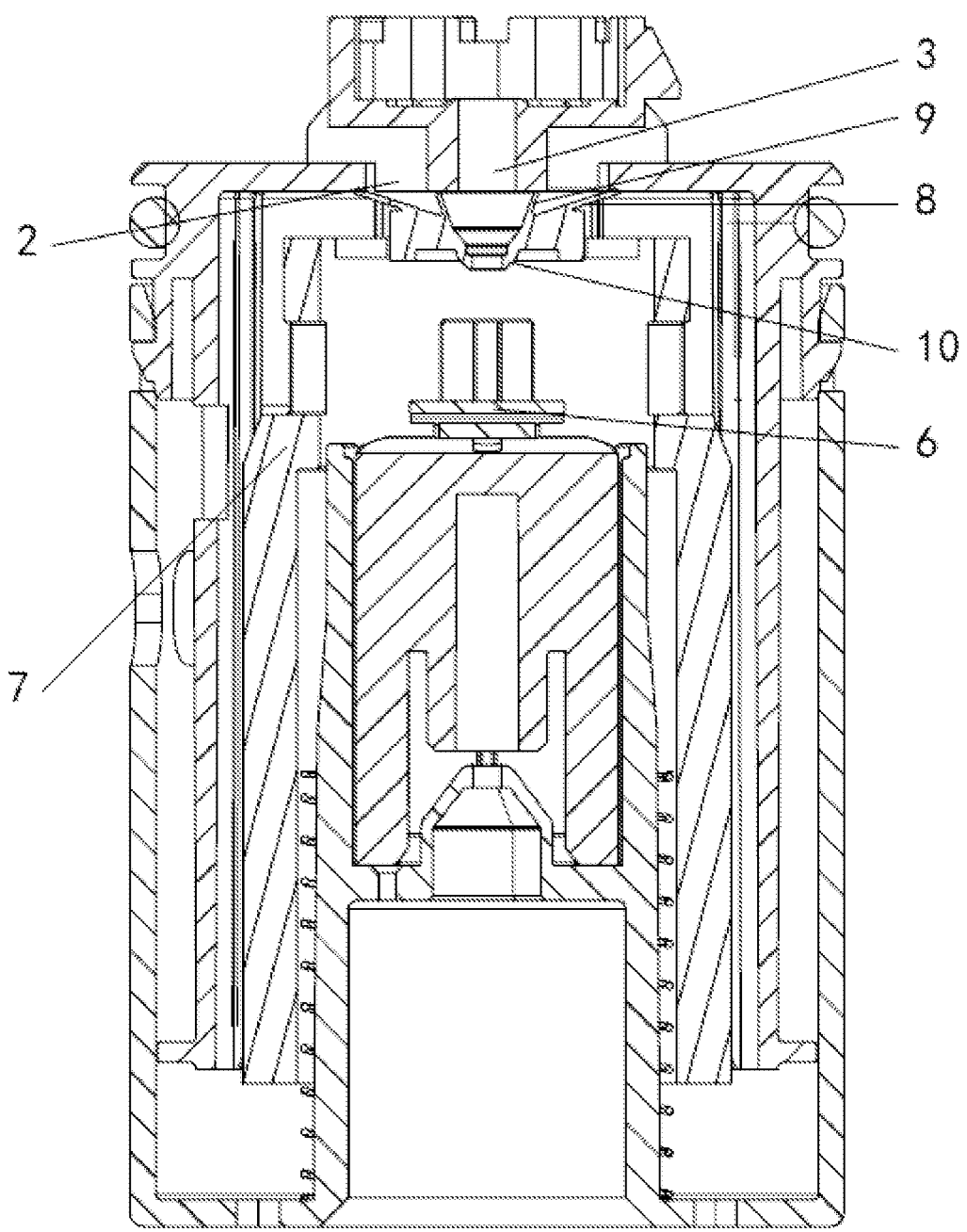
FIG. 6 is a schematic view of a sealing part of the sealing structure of the invention provided on a large valve core.
Figure 7:
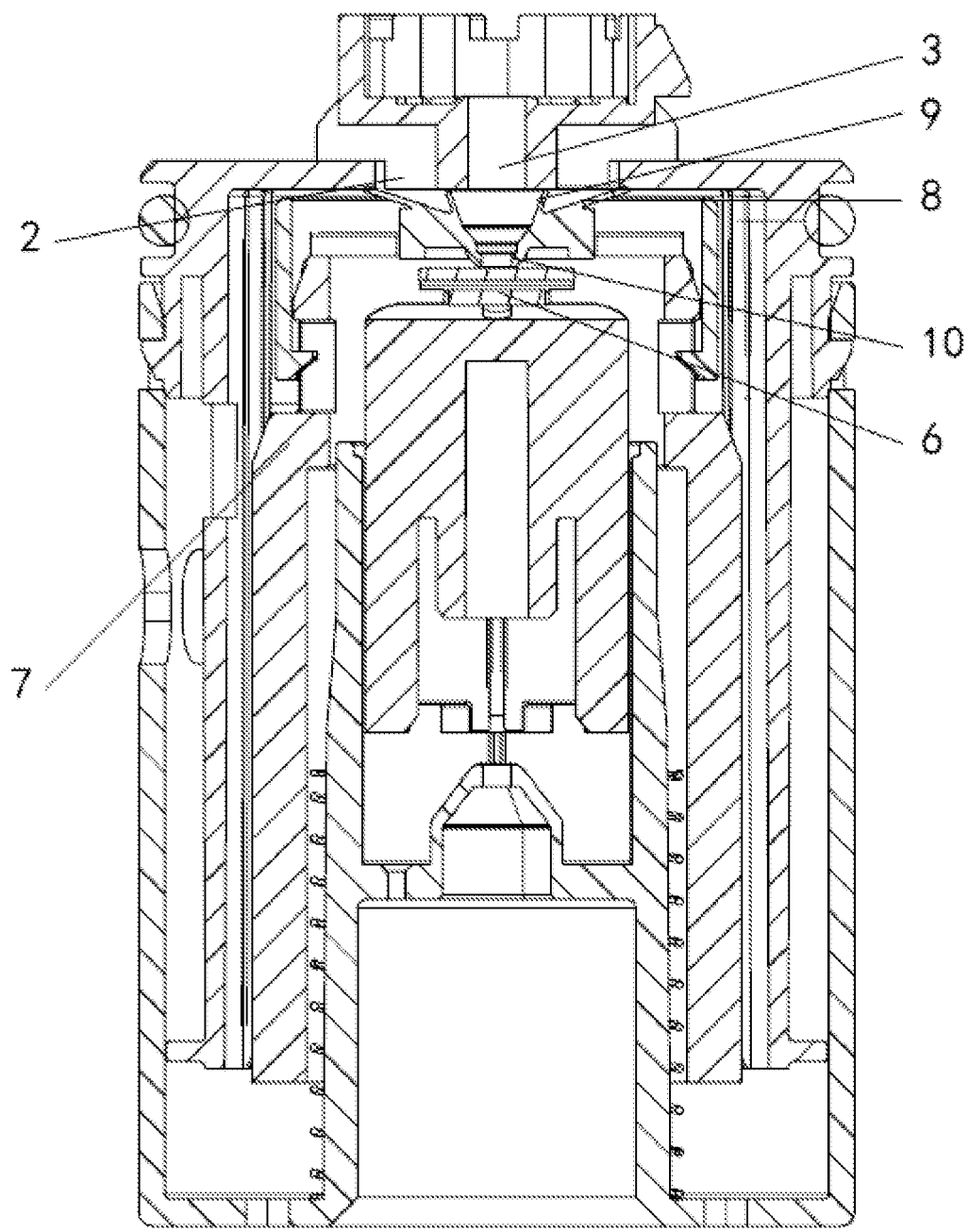
FIG. 7 is a schematic view of a fully closed sealing structure of the invention.

Referring to FIGS. 4, 5 and 7, according to the embodiment, a sealing part is provided in the inner cavity of the valve body between the large valve core 5 and the top surface of the inner cavity of the valve body 1. When it is required to close the large discharge port 2, the large valve core 5 moves to a closed position, and cooperates with the sealing part to close the large discharge port 2, forming a first communication passage communicating with the small discharge port 3. When it is required to close the small discharge port 3, the small discharge port 3 can be closed by lifting the small valve core 6 to seal the first communication passage. Only one sealing part is required to achieve the opening and closing of the two valve cores to the two discharge ports respectively, which solves the problem that the sealing components of the existing combination valve need to be separately provided for the two valve cores respectively. The specific structure of this example is further described below.

According to this embodiment, in an implementation, the sealing part may a bearing member 4 and a sealing assembly. The bearing member 4 is movably arranged in the inner cavity of the valve body 1 or is fixedly connected to the large valve core 5. The bearing member 4 is provided with a through hole matched with the small discharge port 3. The sealing assembly is provided on the bearing member 4 and/or on the top surface of the inner cavity of the valve body 1, and is used for sealing the large discharge port 2 in cooperation with the bearing member 4, forming a first communication passage in cooperation with the small discharge port 3 and the through hole.

Further, when the sealing assembly is provided on the bearing member 4, the sealing assembly is integrally formed with the bearing member 4. When the sealing assembly is provided on the top surface of the inner cavity of the valve body 1, the sealing assembly is integrally formed with the valve body 1.

Further, the sealing assembly may be integrally formed with the bearing member 4 and the valve body 1, respectively, when the sealing assembly is partially disposed on the bearing member 4 and partially disposed on the valve body 1.

Specifically, the bearing member 4 may specifically include a sealing unit 401 and a sliding unit 402. The sliding unit 402 is slidably connected to the inner cavity of the valve body 1 by means of the sliding rail and sliding groove. The sealing unit 401 is mounted on the sliding unit 402 for cooperation with the sealing assembly to open and close the two discharge ports.

In the present embodiment, the sealing part may also be a sealing assembly that specifically includes a plurality of first seals and second seals. The first seals are respectively provided on the corresponding large exhaust holes 2 for forming a second communication passage communicating the inner cavity of the valve body 1 with the large exhaust holes 2. The second seals are provided on the corresponding small discharge ports 3 for forming a first communication passage.

When it is required to close the large discharge port, the large valve core 2 moves up to the top end of the inner cavity of the valve body 1. The top surface of the large valve core 5 cooperates with the bottom end of the second communication passage to achieve the sealing of the bottom end opening of the second communication passage, thereby achieving the closing of the large discharge port 2. When it is required to close the small discharge port, the small valve core 6 moves up to the top end of the inner cavity of the valve body 1. The top surface of the small valve core 6 cooperates with the bottom end of the first communication passage to achieve the sealing of the bottom end opening of the first communication passage, thereby achieving the closing of the small discharge port 3.

In the present embodiment, the sealing part may be another sealing assembly including a large sealing ring 7, a medium sealing ring 8, and a small sealing ring 9. The large sealing ring 7, the middle sealing ring 8 and the small sealing ring 9 are all arranged on the top surface of the inner cavity of the valve body 1, and correspond to the large discharge port 2. The large sealing ring 7 is sleeved on the large discharge port 2, the medium sealing ring 8 is located between the large discharge port 2 and the small discharge port 3, and the small sealing ring 9 is also located between the large discharge port 2 and the small discharge port 3 for forming a first communication passage.

When it is required to close the large discharge port 2, the large valve core 2 moves up to the top end of the inner cavity of the valve body 1, and the top surface of the large valve core 5 cooperates with the bottom ends of the large sealing ring 7 and the medium sealing ring 8 to achieve the closing of the large discharge port 2. When it is required to close the small discharge port 3, the small valve core 6 moves up to the top end of the inner cavity of the valve body 1. The top surface of the small valve core 6 cooperates with the bottom end of the first communication passage to achieve the sealing of the bottom end opening of the first communication passage, thereby achieving the closing of the small discharge port 3.

Referring to FIG. 7, in this embodiment, the sealing part may also be a bearing member and sealing assembly provided directly on the large valve core. The bearing member is provided on the top surface of the large valve core, and a through hole matched with the small discharge port is provided on the bearing member. The sealing assembly may include a large sealing ring 7, a medium sealing ring 8 and a small sealing ring 9. The large sealing ring 7 and the medium sealing ring 8 are both provided on the upper surface of the bearing member and correspond to the large discharge port 2. The large sealing ring 7 is sleeved on the large discharge port 2. The medium sealing ring 8 is located between the large discharge port 2 and the small discharge port 3. The small sealing ring 9 is provided at the through hole for cooperating to form a first communication passage.

When it is required to close the large discharge port 2, the large valve core 2 moves up to the top end of the inner cavity of the valve body 1, and the upper ends of the large sealing ring 7 and the medium sealing ring 8 cooperate with the top surface of the inner cavity of the valve body to achieve the closing of the large discharge port 2. When it is required to close the small discharge port 3, the small valve core 6 moves up to the top end of the inner cavity of the valve body 1. The top surface of the small valve core 6 cooperates with the bottom end of the first communication passage to achieve the sealing of the bottom end opening of the first communication passage, thereby achieving the closing of the small discharge port 3.

Of course, in other embodiments, the sealing assembly may be mounted directly on the large valve core without the use of the bearing member, which is not specifically limited herein.

Example II

This example is a detailed description of various embodiments of the sealing assembly in the above-mentioned Example I:

Embodiment 1: referring to FIG. 1, in particular, the sealing assembly includes a large sealing ring 7, a medium sealing ring 8 and a small sealing ring 9.

The upper end face of the bearing member 4 is provided with a large sealing ring 7 and a medium sealing ring 8.

Herein, the diameter of the large sealing ring 7 is required to be greater than the maximum diameter of the large discharge port 2, and the diameter of the middle sealing ring 8 is required to be less than the minimum diameter of the large discharge port 2 and the maximum diameter of the small discharge port 3. This is provided in order to ensure that when the bearing member 4 is in the closed position, it can be closely attached to the wall surfaces of the top surface of the inner cavity of the valve body 1 on the inside and outside of the large discharge port 2 so as to achieve sealing against the large discharge port 2.

When the large discharge port 2 is sealed, the small discharge opening 3 communicates with the inner cavity of the valve body 1 through the through hole of the bearing member 4. In order to seal the small discharge opening 3, a small sealing ring 9 having a diameter larger than that of the through hole is provided on the lower end surface of the sealing ring. The small sealing ring 9 may come into contact with the top surface of the small valve core 6 and seal the small discharge port 3 when the small valve core 6 rises.

Figure 2:
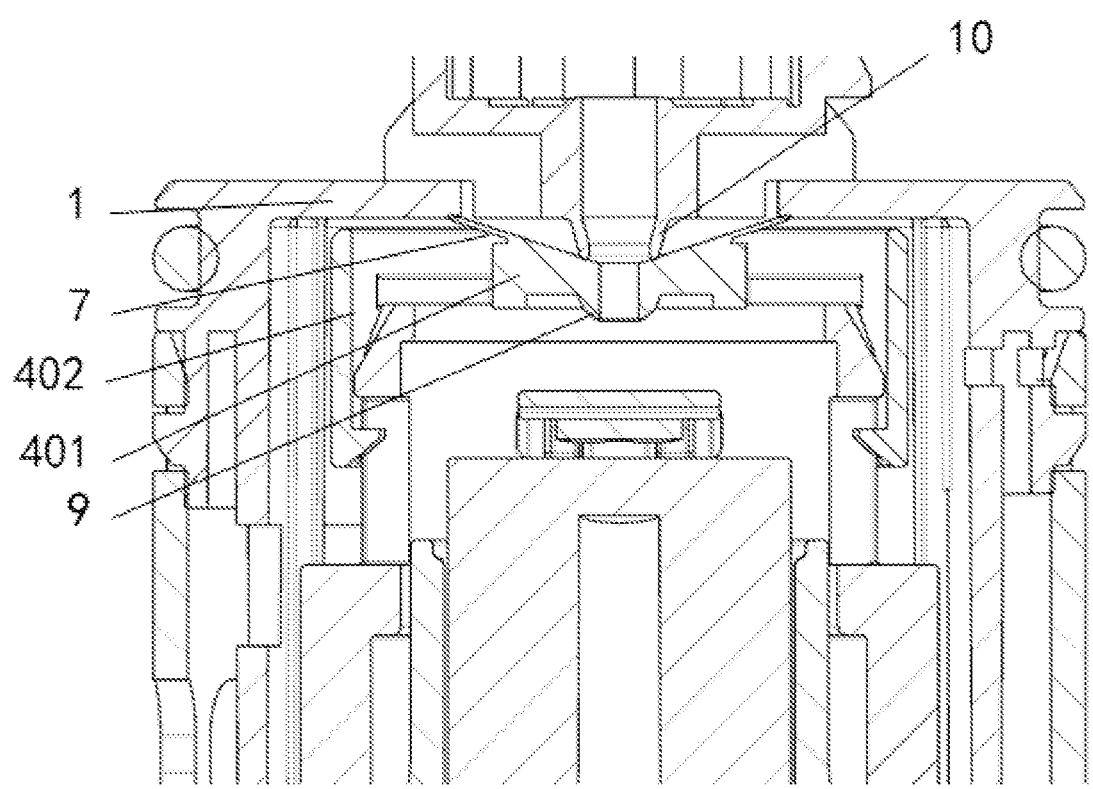
FIG. 2 is a schematic view of another embodiment of the sealing structure of the invention.

Embodiment 2: referring to FIG. 2, this embodiment is a modification of Embodiment 1 described above. The large sealing ring 7 and the small sealing ring 9 is provided in the same manner, and the medium sealing ring 8 is removed. Specifically, a middle extension ring 10 is provided on the wall surface of the top surface of the inner cavity of the valve body 1 located between the large discharge port 2 and the small discharge port 3. The lower end of the middle extension ring 10 is used for contacting the upper end surface of the bearing member 4. Thus, the bearing member 4, when moved to the closed position, mates with the large sealing ring 7 to achieve sealing of the large discharge port 2, and also mates with the through hole of the bearing member 4 to achieve communication of the small discharge port 3 with the inner cavity of the valve body 1. The sealing manner of the small sealing ring 9 is the same as that of embodiment 1, and will not be described in detail.

Embodiment III: this embodiment is also a modification of Embodiment I described above. The medium sealing ring 8 and the small sealing ring 9 are provided in the same manner, and the large sealing ring 7 is removed. Specifically, a large extension ring is provided on the wall surface of the top surface of the inner cavity of the valve body 1 outside the large discharge port 2, and the lower end of the large extension ring is used to contact the upper end surface of the bearing member 4. The bearing member 4, when moved to the closed position, mates with the medium sealing ring 8 to effect sealing against the large discharge port 2. The sealing manner of the medium sealing ring 8 and the small sealing ring 9 to the small discharge port 3 is the same as that of Embodiment I and will not be described in detail.

Embodiment IV: this embodiment is also a modification of Embodiment I described above. The small sealing ring 9 is provided in the same manner, and the large sealing ring 7 and the medium sealing ring 8 are removed. Specifically, a large extension ring is provided on the wall surface of the top surface of the inner cavity of the valve body 1 outside the large discharge port 2, and the lower end of the large extension ring is used to contact the upper end surface of the bearing member 4. A middle extension ring 10 is provided on the wall surface of the inner cavity of the valve body 1 between the large discharge port 2 and the small discharge port 3. The lower end of the middle extension ring 10 is also used to contact the upper end surface of the bearing member 4. The large extension ring and the medium extension ring 10 cooperate with the bearing member 4 to achieve sealing of the large discharge port 2 when the bearing member 4 is moved to the closed position. The small sealing ring 9 seals the small discharge port 3 in the same manner as Embodiment I, which will not be described in detail.

Figure 3:
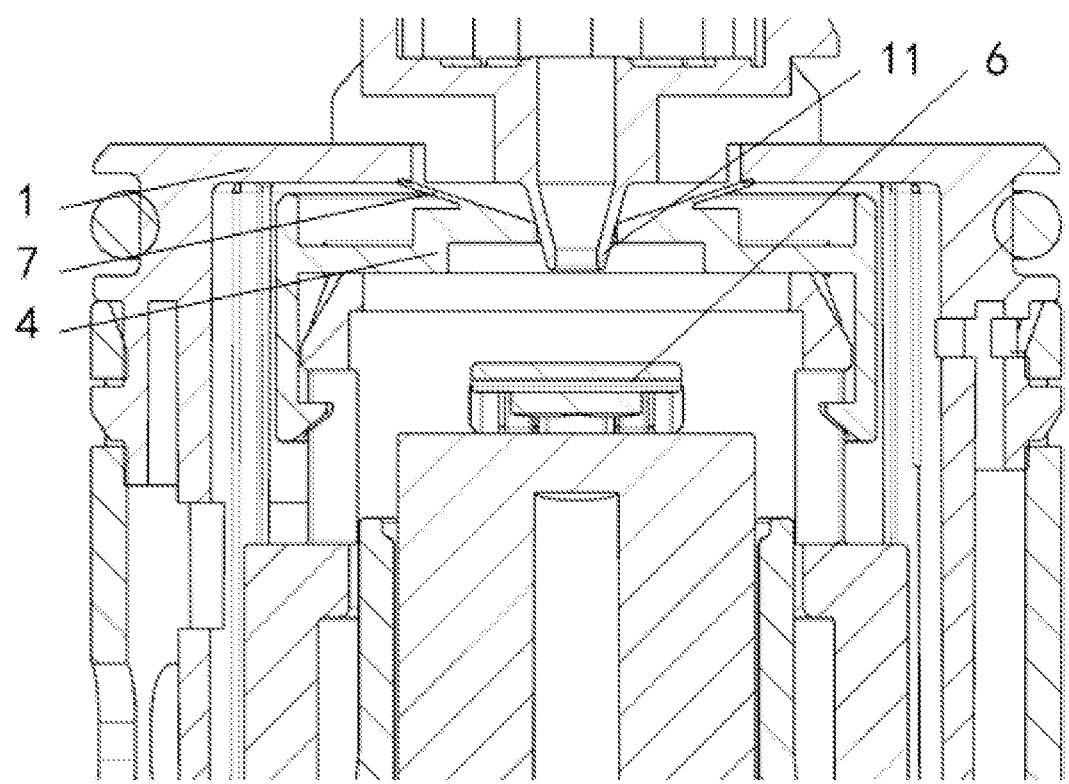
FIG. 3 is a schematic view of another embodiment of the sealing structure of the invention.

Embodiment V: referring to FIG. 3, this embodiment is also a modification of Embodiment I described above. The large sealing ring 7, the medium sealing ring 8, and small sealing ring 9 are all removed. Specifically, a large extension ring is provided on the wall surface of the top surface of the inner cavity of the valve body 1 outside the large discharge port 2, and the lower end of the large extension ring is used to contact the upper end surface of the bearing member 4. A small extension ring 11 is provided on the wall surface of the top surface of the inner cavity of the valve body 1 located between the large discharge port 2 and the small discharge port 3. The diameter of the upper end of the small extension ring 11 is greater than the diameter of the inner ring of the bearing member 4, and the diameter of the lower end is less than the diameter of the inner ring of the bearing member 4. Namely, the outer side wall of the small extension ring 11 is used for contacting the hole wall of the through hole of the bearing member 4. The sealing against the large discharge port 2 is achieved with the cooperation of the bearing member 4 with the outer side wall of the small extension ring 11 and the large extension ring when the bearing member 4 is moved to the closed position. The lower end of the small extension ring 11 then cooperates with the upper surface of the small float to seal the small discharge port 3. Of course, in other embodiments, the sealing assembly can also be provided on the first float and the second float to directly cooperate with the large discharge port 2 and the small discharge port 3 for sealing. It is also possible that the sealing assembly is provided directly on each of the large discharge port 2 and the small discharge port 3 and extends downwards to cooperate with the top surface of the valve core for sealing. The specific implementation is numerous and not specifically limited herein.

An annular sealing ring or extension ring is used in this example to seal the large discharge port 2 in cooperation with the bearing member 4 and the top surface of the inner cavity of the valve body 1 and to seal the small discharge port 3 in cooperation with the small valve core 6. The provision of an annular component further facilitates the closing and opening of the two discharge ports. For example, when the large discharge port 2 is closed or opened, only the annular surface of the upper end of the annular component is required to be adhered to the top surface of the inner cavity of the valve body 1. Compared with the sealing manner of the sealing component such as a sealing block to the discharge port, the adhered area is small, and thus the amount of force required to close and open the discharge port is also smaller. The opening and closing of the valve can also be more flexible.

Example III

This example is further provided with a pressure maintaining part based on Example I or Example II.

Figure 8:
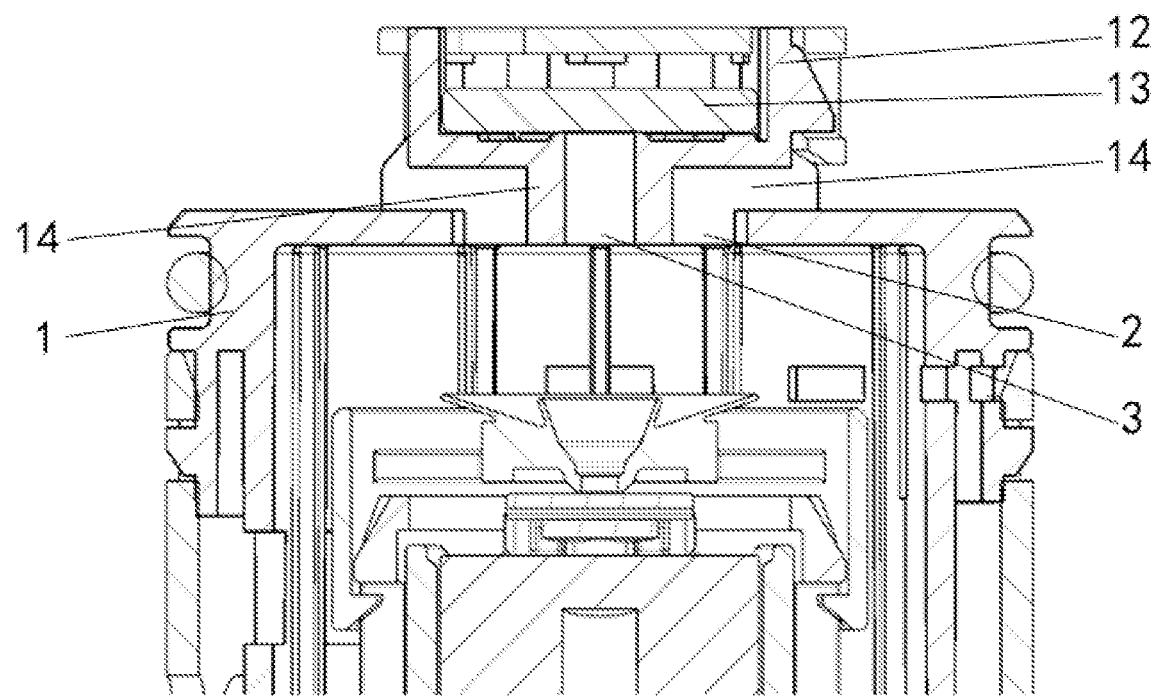
FIG. 8 is a schematic view of a pressure maintaining part of the sealing structure of the invention.
Figure 9:
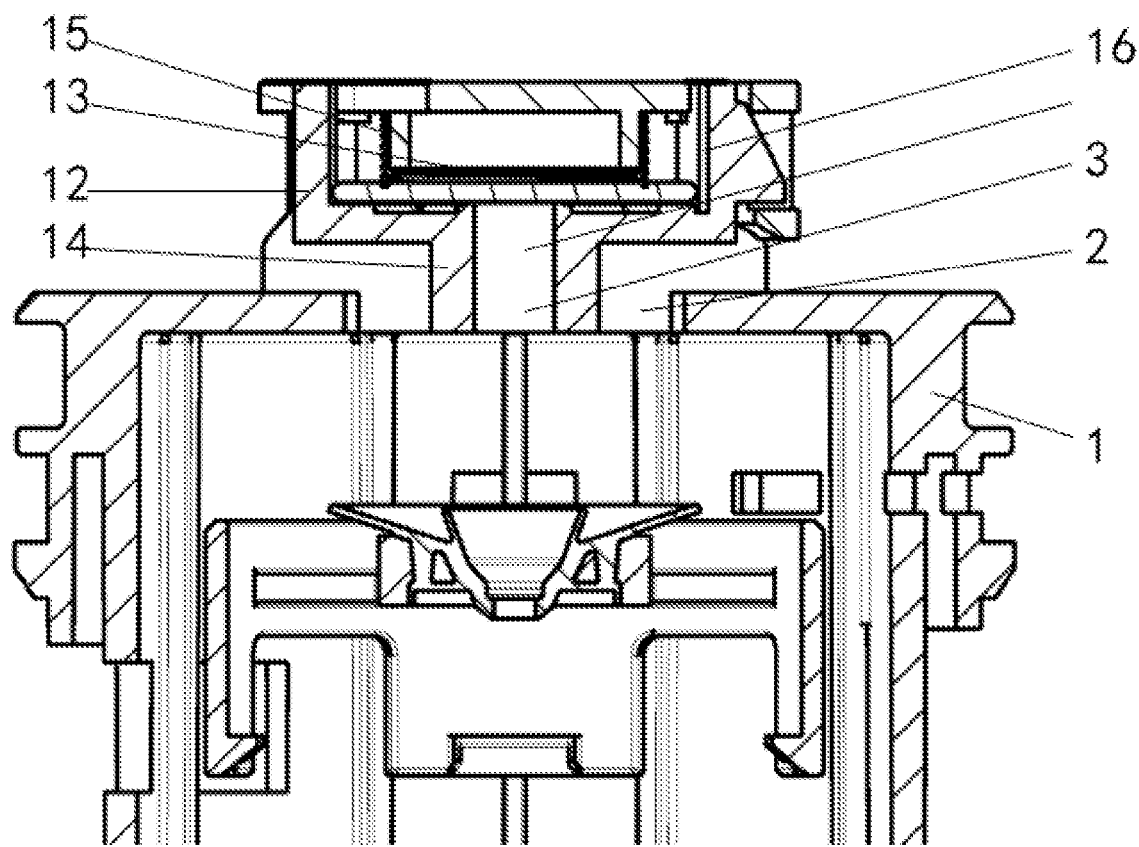
FIG. 9 is another schematic view of the pressure maintaining part of the sealing structure of the invention.

Referring to FIGS. 8 and 9, a pressure maintaining part is provided on the valve body 1. Specifically, the pressure maintaining part may include an elevation tube 14, a pressure maintaining shell 12, and a pressure maintaining cap 13;

Herein, an accommodating cavity is provided in the pressure maintaining shell 12, and an inflow passage and an outflow passage communicating with the accommodating cavity are provided on the pressure maintaining shell 12. At least one flow passage 16 is opened on the inner wall surface of the accommodating cavity for communicating the inflow passage and the outflow passage. The pressure maintaining shell 12 is mounted on the valve body 1, and the inflow passage communicates with the small discharge port 3. A pressure maintaining cap 13 is slidably connected to the accommodating cavity for covering and closing the inflow passage by gravity. One end of the elevation tube 14 is mounted on the valve body 1 and communicates with the small discharge opening 3. The other end of the elevation tube 14 is connected to the pressure maintaining shell 12 and communicates with the inflow passage. The pressure maintaining shell 12 forms, by cooperation 1 between the valve body 1 and the elevation tube 14, a large exhaust passage 15 communicating with the large exhaust port 2 for exhausting the gas exhausted from the large exhaust port 2.

In the present embodiment, an elevation tube 14 is provided on the small discharge port 3 of the valve body 1, and a pressure maintaining shell 12 is provided on the elevation tube 14. An inflow passage is provided in the pressure maintaining shell 12 to communicate with the elevation tube 14, with an accommodating cavity and an outflow passage provided. A slidable pressure maintaining cap 13 is provided in the accommodating cavity, and the inflow passage is closed by the gravity of the pressure maintaining cap 13 itself. When the pressure in the valve body 1 is greater than the gravity of the pressure maintaining cap 13 itself, the pressure maintaining cap 13 can be pushed open, so that the gas can be discharged through the small discharge port 3, the inflow passage, the flow passage 16 on the accommodating cavity and the outflow passage in sequence, so as to achieve the function of the rolling-over valve. On the basis of implementing the roll-over valve, an elevation tube 14 is provided between the valve body 1 and the pressure maintaining shell 12 to elevate the pressure maintaining shell 12, so that a passage through which gas can flow is generated between the pressure maintaining shell 12 and the valve body 1. Thus, the pressure maintaining shell 12 does not interfere with the large discharge port 2, and the problem of the pressure maintaining structure easily affecting the flow area of the remaining discharge ports is solved.

In this embodiment, the pressure maintaining assembly may further include an elastic member 15 which is provided in the accommodating cavity and of which two ends are respectively connected to the inner wall surface of the accommodating cavity and the pressure maintaining cap 13. When the elastic member 15 is used, the amount of the pressing force of the pressure maintaining cap 13 against the inflow passage becomes its own weight plus the elastic force exerted by the elastic member 15. The elastic member 15 may be a spring or other member having elastic force, and is not particularly limited herein.

Further, a seal may be provided on the bottom surface of the pressure maintaining cap 13. For example, a flexible rubber layer may be provided on the bottom surface of the pressure maintaining cap 13, so that the sealing effect between the pressure maintaining cap 13 and the inflow passage is better.

Further, the pressure maintaining shell 12 may be provided with a plurality of extension pieces for fixedly connecting with the valve body 1. For example, a plurality of connecting posts or connecting pieces may be provided, and the both ends are respectively connected with the outer surfaces of the valve body 1 and the pressure maintaining shell 12, so as to further enhance the firmness of the connection between the pressure maintaining shell 12 and the valve body 1.

In the present example, the sliding mode between the pressure maintaining cap 13 and the accommodating cavity of the pressure maintaining shell 12 may be the cooperation of a slide groove and a sliding rail. How the slide groove and the sliding rail are specifically arranged on these two components may not be specifically defined.

Next, the present embodiment exemplifies a plurality of embodiments of a combination valve capable of simultaneously achieving a refueling limit valve function and a rollover valve function. The valve body 1 of the combination valve is provided with the valve core accommodating cavity, and the top surface of the valve core is provided with a large discharge port 2 and a small discharge port 3.

With reference to the drawings, when the height of the fluid discharge chamber connected to the external component formed by the valve body 1 cooperating with the connecting flange is relatively low, the thickness of the pressure maintaining shell 12 can be designed to be thinner, and thus the width of the pressure maintaining shell 12 will become larger. In order to avoid the pressure maintaining shell 12 being too wide so as to interfere with the large discharge port 2 so that the flow area of the large discharge port 2 is reduced, an elevation tube 14 can be provided at the bottom of the pressure maintaining shell 12. Two ends of the elevation tube 14 respectively communicate with the inflow passage of the outer shell and the small discharge port 3, so as to elevate the height of the bottom surface of the pressure maintaining shell 12, without interfering with the top surface of the valve body 1. Thus, the large discharge port 2 is not affected.

Referring to the drawings, when the height of the fluid discharge chamber is high, the width of the pressure maintaining shell 12 may be designed to be smaller than the minimum diameter of the large discharge port 2, so that the elevation tube 14 may or may not be provided, directly connecting the inflow passage with the small discharge port 3. In this design, the volume of the accommodating cavity is smaller, and the volume of the pressure maintaining cap 13 which can be accommodated is also smaller. The self-weight of the pressure maintaining cap 13 with a small volume may not meet the required pressing force requirements, so that the way of the pressure maintaining cap 13 cooperating with the elastic member 15 is more suitable for this design.

Further, the pressing force of the pressure maintaining cap 13 against the inflow passage is achieved by self-weight, and may be provided by a heavy material or a light material cooperating with the elastic member 15. When an elastic member 15 is used, both ends of the elastic member 15 are respectively connected to an upper end of the pressure maintaining cap 13 and a top surface of the accommodating cavity. The pressing force required for closing the inflow passage is formed by the elastic force of the elastic member 15 cooperating with the gravity force of the pressure maintaining cap 13.

Example IV

A combination valve includes the sealing structure according to Example 1 or Example 2. A slidable bearing member 4 is provided in the valve body 1 and a sealing assembly is provided on the bearing member 4 and/or the valve core. When it is required to close the large discharge port 2, the sealing assembly cooperates with the bearing member 4 to seal the large discharge port 2. At the same time, a first communication passage for the inner cavity of the valve body 1 to communicate with the small discharge port 3 can be left through the through hole on the bearing member 4. When it is required to further close the small discharge port 3, the small discharge port 3 can be closed by lifting the small valve core 6 to seal the first communication passage. Only one bearing member 4 is required to achieve the opening and closing of the two valve cores to the two discharge ports, which solves the problem that the sealing components of the existing combination valve need to be separately provided for the two valve cores.

The embodiments of the invention have been described in detail with reference to the accompanying drawings, but the invention is not limited to the above embodiments. Even if various changes are made to the invention, provided that these changes fall within the scope of the claims of the invention and equivalent technologies, they still fall within the scope of protection of the invention.

The invention claimed is:

1. A sealing structure of a valve body, wherein the sealing structure is provided in a valve body of a valve; a small discharge port and a large discharge port wound around the small discharge port are provided on a top surface of an inner cavity of the valve body; the small discharge port corresponds to a first exhaust passage, and the large discharge port corresponds to a second exhaust passage; a small valve core corresponds to the small discharge port, and a large valve core corresponds to the large discharge port; the sealing structure comprises:
   a sealing part provided in the inner cavity of the valve body and located between the large valve core and the top surface of the inner cavity of the valve body, for cooperating with the large valve core to seal the large discharge port and close the second exhaust passage, forming a first communication passage communicating the inner cavity of the valve body with the small discharge port, wherein a bottom end of the first communication passage corresponds to the small valve core;
   when it is required to close the large discharge port, the large valve core slides to a closed position and cooperates with the sealing part to seal the large discharge port, and closes the second exhaust passage to form the first communication passage; when it is required to close the small discharge port, the small valve core slides to a closed position and cooperates with the bottom end of the first communication passage to seal the small discharge port and close the first exhaust passage;
   wherein the sealing part includes a bearing member and a sealing assembly;
   wherein the bearing member is movably arranged in the inner cavity of the valve body or is fixedly connected to the large valve core; and the bearing member is provided with a through hole matched with the small discharge port;
   wherein the sealing assembly is provided on the bearing member and/or on the top surface of the inner cavity of the valve body, and is used for cooperating with the bearing member to seal the large discharge port and cooperating with the small discharge port and the through hole to form the first communication passage;
   wherein the bearing member comprises a bearing unit and a sliding unit; the sliding unit is slidably connected to the inner cavity of the valve body; and the bearing unit is mounted on the sliding unit.

2. The sealing structure of the valve body according to claim 1, wherein the sealing assembly comprises a large sealing ring, a medium sealing ring, and a small sealing ring;
   the large sealing ring and the medium sealing ring are both provided on an upper surface of the bearing member and correspond to the large discharge port; the large sealing ring is sleeved on the large discharge port; the medium sealing ring is located between the large discharge port and the small discharge port; and
   the small sealing ring is provided at the through hole for cooperating to form the first communication passage.

3. The sealing structure of the valve body according to claim 1, wherein the sealing assembly comprises a large sealing ring, a medium extension ring, and a small sealing ring;
   the large sealing ring is provided on the upper surface of the bearing member, corresponds to the large discharge port, and is sleeved on the large discharge port; the medium extension ring is provided on the top surface of the inner cavity of the valve body, corresponds to the large discharge port and is located between the large discharge port and the small discharge port;
   the small sealing ring is provided at the through hole for cooperating to form the first communication passage.

4. The sealing structure of the valve body according to claim 1, wherein the sealing assembly comprises a large extension ring, a medium sealing ring, and a small sealing ring;
   the large extension ring is provided on the top surface of the inner cavity of the valve body, corresponds to the large discharge port, and is sleeved on the large discharge port; the medium sealing ring is provided on the upper surface of the bearing member, corresponds to the large discharge port, and is located between the large discharge port and the small discharge port; and
   the small sealing ring is provided at the through hole for cooperating to form the first communication passage.

5. The sealing structure of the valve body according to claim 1, wherein the sealing assembly comprises a large extension ring, a medium extension ring, and a small sealing ring;
   the large extension ring is provided on the top surface of the inner cavity of the valve body, corresponds to the large discharge port, and is sleeved on the large discharge port; the medium extension ring is provided on the top surface of the inner cavity of the valve body, corresponds to the large discharge port, and is located between the large discharge port and the small discharge port; and
   the small sealing ring is provided at the through hole for cooperating to form the first communication passage.

6. The sealing structure of the valve body according to claim 1, wherein the sealing assembly comprises a large extension ring and a small extension ring;
   the large extension ring is provided on the top surface of the inner cavity of the valve body, corresponds to the large discharge port, and is sleeved on the large discharge port;
   the small extension ring is provided on the top surface of the inner cavity of the valve body and corresponds to the large discharge port; an upper end of the small extension ring is located between the large discharge port and the small discharge port, and the diameter of the lower end is smaller than the diameter of the through hole;
   the large extension ring, an outer side wall of the small extension ring, and the bearing member cooperate for sealing the large discharge port; and the small extension ring is used to form the first communication passage in cooperation with the small discharge port.

7. The sealing structure of the valve body according to claim 1, wherein the sealing assembly comprises a large extension ring, a medium extension ring, and a small extension ring;

the large extension ring is provided on the top surface of the inner cavity of the valve body, corresponds to the large discharge port, and is sleeved on the large discharge port; the medium extension ring is provided on the top surface of the inner cavity of the valve body, corresponds to the large discharge port, and is located between the large discharge port and the small discharge port; and the small extension ring is provided on the top surface of the inner cavity of the valve body for cooperating with the small discharge port to form the first communication passage.

8. The sealing structure of the valve body according to claim 1, wherein the sealing assembly is integrally formed with the bearing member when the sealing assembly is provided on the bearing member; and the sealing assembly is integrally formed with the valve body when the sealing assembly is provided on the top surface of the inner cavity of the valve body.

9. The sealing structure of the valve body according to claim 1, further comprising a pressure maintaining part provided on the valve body; the pressure maintaining part comprises a pressure maintaining shell and a pressure maintaining cap; an accommodating cavity is provided in the pressure maintaining shell, and an inflow passage and an outflow passage in communication with the accommodating cavity are further provided on the pressure maintaining shell; the pressure maintaining shell is provided on the top surface of the valve body, and the inflow passage is in communication with the small discharge port; and the pressure maintaining cap is slidably connected to the accommodating cavity for switching the inflow passage.

10. The sealing structure of the valve body according to claim 9, wherein the pressure maintaining part further comprises an elevation tube provided between the pressure maintaining shell and the valve body, and both ends are respectively in communication with the small discharge port and the inflow passage of the pressure maintaining shell; and the pressure maintaining shell cooperates with the valve body through the elevation tube to form the second exhaust passage that communicates with the large discharge port.

11. The sealing structure of the valve body according to claim 9, wherein the pressure maintaining part further comprises an elastic member provided in the accommodating cavity, and both ends of the elastic member are respectively connected to an inner wall surface of the accommodating cavity and the pressure maintaining cap for providing a pressing force for the pressure maintaining cap to close the inflow passage.

12. A valve, comprising the sealing structure of the valve body according to claim 1.

13. A combined fill limit vent valve (CFLVV), comprising the sealing structure of the valve body according to claim 1.

14. A sealing structure of a valve body, wherein the sealing structure is provided in a valve body of a valve; a small discharge port and a large discharge port wound around the small discharge port are provided on a top surface of an inner cavity of the valve body; the small discharge port corresponds to a first exhaust passage, and the large discharge port corresponds to a second exhaust passage; a small valve core corresponds to the small discharge port, and a large valve core corresponds to the large discharge port; the sealing structure comprises:

a sealing part provided in the inner cavity of the valve body and located between the large valve core and the top surface of the inner cavity of the valve body, for cooperating with the large valve core to seal the large discharge port and close the second exhaust passage, forming a first communication passage communicating the inner cavity of the valve body with the small discharge port, wherein a bottom end of the first communication passage corresponds to the small valve core; when it is required to close the large discharge port, the large valve core slides to a closed position and cooperates with the sealing part to seal the large discharge port, and closes the second exhaust passage to form the first communication passage; when it is required to close the small discharge port, the small valve core slides to a closed position and cooperates with the bottom end of the first communication passage to seal the small discharge port and close the first exhaust passage wherein the large discharge port is a plurality of large exhaust holes provided around the small discharge port; the sealing part comprises a sealing assembly including a number of first and second seals; the first seals are respectively provided at the corresponding large exhaust holes for forming a second communication passage communicating the inner cavity of the valve body with the large exhaust holes; and the second seal is provided at the small discharge port for forming the first communication passage.

15. A sealing structure of a valve body, wherein the sealing structure is provided in a valve body of a valve; a small discharge port and a large discharge port wound around the small discharge port are provided on a top surface of an inner cavity of the valve body; the small discharge port corresponds to a first exhaust passage, and the large discharge port corresponds to a second exhaust passage; a small valve core corresponds to the small discharge port, and a large valve core corresponds to the large discharge port; the sealing structure comprises:

a sealing part provided in the inner cavity of the valve body and located between the large valve core and the top surface of the inner cavity of the valve body, for cooperating with the large valve core to seal the large discharge port and close the second exhaust passage, forming a first communication passage communicating the inner cavity of the valve body with the small discharge port, wherein a bottom end of the first communication passage corresponds to the small valve core; when it is required to close the large discharge port, the large valve core slides to a closed position and cooperates with the sealing part to seal the large discharge port, and closes the second exhaust passage to form the first communication passage; when it is required to close the small discharge port, the small valve core slides to a closed position and cooperates with the bottom end of the first communication passage to seal the small discharge port and close the first exhaust passage wherein the sealing part comprises a sealing assembly including a large sealing ring, a medium sealing ring, and a small sealing ring;

the large sealing ring and the medium sealing ring are both provided on the top surface of the inner cavity of the valve body, and correspond to the large discharge port; the large sealing ring is sleeved on the large discharge port; the medium sealing ring is located between the large discharge port and the small discharge port; and the small sealing ring is provided on the top surface of the inner cavity of the valve body for forming the first communication passage.

* * * * *

UNITED STATES PATENT AND TRADEMARK OFFICE
CERTIFICATE OF CORRECTION

PATENT NO. : 12,281,711 B2
APPLICATION NO. : 18/038909
DATED : April 22, 2025
INVENTOR(S) : Xiaotong Zhu Page 1 of 1

It is certified that error appears in the above-identified patent and that said Letters Patent is hereby corrected as shown below:

On the Title Page

In (71) Applicant, change:
JTR AY AUTOMOTIVE TECHNOLOGIES (JIAXING) CO., LTD., Zhejiang (CN); SHANGHAI JTR AUTOMOTIVE COMPONENT CO., LTD., Shanghai (CN)

To:
YINGZHI AIYI INTELLIGENT AUTOMOTIVE TECHNOLOGIES (JIAXING) CO., LTD., Zhejiang (CN); SHANGHAI JTR AUTOMOTIVE COMPONENT CO., LTD., Shanghai (CN).

Signed and Sealed this
Twenty-seventh Day of May, 2025

Coke Morgan Stewart
*Acting Director of the United States Patent and Trademark Office*